United States Patent [19]

Kurz et al.

[11] Patent Number: 4,900,532

[45] Date of Patent: Feb. 13, 1990

[54] CONTINUOUS PROCESS FOR REFINING SILICON

[75] Inventors: Günter Kurz, Duesseldorf; Ingo Schwirtlich; Klaus Gebauer, both of Krefeld, all of Fed. Rep. of Germany

[73] Assignee: Bayer Aktiengesellschaft, Leverkusen, Fed. Rep. of Germany

[21] Appl. No.: 229,984

[22] Filed: Aug. 9, 1988

[30] Foreign Application Priority Data

Aug. 19, 1987 [DE] Fed. Rep. of Germany ....... 3727646

[51] Int. Cl.$^4$ ............................................. C01B 33/02
[52] U.S. Cl. ................................. 423/348; 156/605; 156/DIG. 64; 423/349; 423/350
[58] Field of Search ...................... 423/348, 349, 350; 156/DIG. 64, 605

[56] References Cited

U.S. PATENT DOCUMENTS 3,442,622  6/1969  Monnier et al. ..................... 156/606
3,556,775  1/1971  Kuratomi ........................... 75/59.11
4,231,755  11/1980  Herzer et al. ................ 156/DIG. 64
4,298,423  11/1981  Lindmayer ....................... 156/616 R

OTHER PUBLICATIONS

Advances in Epitaxy and Endotaxy, Schneider et al., 1976, pp. 237-240.

Primary Examiner—Robert L. Stoll
Assistant Examiner—Lori F. Cuomo
Attorney, Agent, or Firm—Connolly and Hutz

[57] ABSTRACT

An improved process for purifying and refining silicon containing impurities comprises:
(i) continuously melting impure silicon to form a thin film silicon melt, preferably on an inclined surface of a silicon-resistant material,
(ii) continuously treating the thin film silicon melt with a reactive gas with or without an inert gas,
(iii) optionally degassing the treated silicon melt, and thereafter
(iv) continuously crystallizing the treated silicon.

11 Claims, 1 Drawing Sheet

CONTINUOUS PROCESS FOR REFINING SILICON

This invention relates to a continuous process for refining silicon, particularly silicon granulate.

BACKGROUND OF THE INVENTION

High-purity silicon is required for a number of applications, including for example the production of $Si_3N_4$ from silicon powder for high-purity ceramics or even in photo-voltaics. Nowadays, highly pure but also expensive semiconductor grade silicon is mainly used for such applications.

To obtain greater economy, inexpensive processes for the production of pure silicon are currently being developed worldwide. The most widely developed processes are based on the purification of inexpensive but impure silicon which is obtained in large quantities by carbothermal reduction of quartz, on the production of pure silicon by the use of prepurified carbon and quartz in carbothermal reduction and on the aluminothermal reduction of silicon tetrachloride with aluminium.

In every case, additional purification steps are necessary to reduce the excessive foreign atom contents of boron, phosphorus, carbon, metals, metal oxides and oxygen to concentrations in the ppm range.

Processes by which these impurities can be reduced are already known. To reduce the high contents of silicon dioxide and carbon mainly present in the form of silicon carbide in the silicon obtained by carbothermal reduction of quartz, German 3,411,955 and European 160,294 describe processes in which molten silicon is filtered through filters of graphite or a compound material of SiC/Si, the solid constituents remaining behind in the filter. This method is not satisfactory in economic terms because the filter layer becomes blocked in operation so that the purification process has to be interrupted. To overcome the blockage, the reactor has to be cooled from around 1420° C., cleaned and the filter material dicarded.

In addition, German 3,403,131 describes a process in which silicon is melted in a graphite crucible so that the non-reduced quartz and the unreacted carbon collect on teh walls of the crucible. In continuous operation, accumulations of slack build up on the walls of the crucible so that the crucible ultimately becomes unuseable, incurring high costs.

German publisched patent applications 3,416,559 and 3,303,691 describe processes in which solid SiC and $SiO_2$ impurities are removed from silicon melts by centrifugation and sedimentation.

Processes for removing dissolved impurities from molten silicon, in which the melt is exposed to the action of various gases, are described in the patent literature (see: German 2,623,413, German 2,929,089, European 7063, German 3,504,723, Brazil 83/6289, U.S. Pat. No. 4,312,849, France 2, 465,684, U.S. Pat. No. 4,298,423, and German 2,944,975).

Although individual foreign atoms can be removed by these processes, all foreign atom concentrations cannot be simultaneously reduced to the level required for solar cells. In particular, metal oxides, particularly aluminium oxide, cannot be economically removed by these processes. Another disadvantage of these processes is that they cannot be carried out continuously.

Accordingly, the object of the present invention is to provide an economic process for refining silicon which is not attended by any of the disadvantages described above.

A process which satisfies these requirements in d highly economical manner has now surprisingly been found. This process is the subject of the present invention.

BRIEF DESCRIPTION OF THE INVENTION

The present invention relates to an improved continuous process for purifying and refining silicon containing foreign atom impurities which comprise:
(i) continuously melting impure silicon to from a thin film silicon melt, preferably on an inclined surface of a silicon-resistant material,
(ii) continuously contacting and treating the thin film silicon melt with a reactive gas with or without an inert gas,
(iii) optionally degassing the treated silicon melt, and thereafter
(iv) continuously crystallizing the treated silicon.

BRIEF DESCRIPTION OF THE DRAWING

The one FIGURE of the drawing illustrates in flow diagramatic fashion the steps of the process of the present invention.

DETAILED DESCRIPTION

Figure 1:
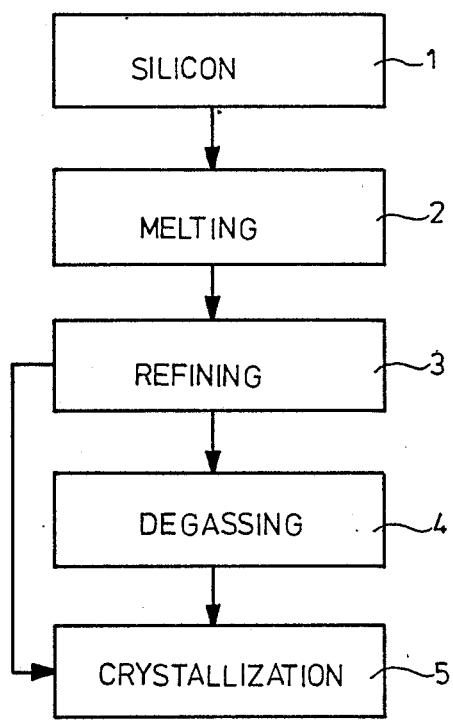

The process which is the subject of the present invention is a continuous process for refining silicon in which silicon is continuously melted to form a thin silicon melt film, the silicon melt film thus formed is continuouly treated with reactive gases and the silicon is the continuously crystallized. Silicon produced in any manner in the form of coarse lumps or as granulate (obtained for example by crushing and grinding) can be purified by this process. According to the invention, however, particularly good results are obtained when the impure silicon used is in the granulate form obtained continuously by reduction of silicon tetrachloride with aluminium granulate.

The production of such a silicon granulate is the subject of European 123,100 and is carried out by aluminothermal reduction of silicon tetrachloride. According to the present invention, both the melting steps and also the gas treatment of the silicon are preferably carried out in contact with one or more surfaces of silicon-resistant materials arranged at an inclination. Inclined surfaces in the form of tubes and/or channels have proved to be particularly suitable. In one particularly preferred embodiment of the process according to the invention, a plurality of surfaces is formed by a pile and/or a stack of silicon-restistant particles. According to the invention, the silicon-resistant materials comprise ceramics, such as SiC, $Si_3N_4$ or $Al_2O_3$, mixed ceramics, high-density graphite, quartz glass, or combinations thereof.

The process according to the invention is described in detail in the following with reference to the flow sheet shown in the FIGURE. A silicon granulat (1) advantageously having an average particle size of about 1 mm, which has been continuously produced in accordance with European 123,100, still contains certain concentrations of metals, particularly aluminium, and metal oxides. In a first step, this granulate is melted in contact with a suitable silicon-resistant material to form a thin film (2). This melting step is carried out continuously in an arrangement of one or more parallel, inclined tubes or channels. In this step, metal oxides are separated from the molten silicon. They collect in the form of a loose powder on the walls of the container and may readily be removed either mechanically or pneumatically.

From the first melting step, the melt is introduced in a second step into the refining unit (3) in which it flows over a loose pile of silicon-restistant particles while a reaction gas flows through gaps between the particles.

In a particularly preferred embodiment of the process according to the invention, hydrogen, steam, silicon tetrahalide, halogen silane and/or hydrogen chloride, optionally with addition of an inert gas, are used as the reactive gases.

The simultaneous addition of these gases has a synergistic effect on the removal of impurities dissolved in the silicon.

The function of this reaction gas is continuously to remove dissolved impurities in the silicon, such as metals, boron and, depending on the particle material, also carbon. A reaction gas which has proved to be particularly effective is formed by the simultaneous addition of silicon tetrachloride, hydrogen chloride, hydrogen, halogen silanes and steam.

To remove dissolved gases, the melt may then be subjected to a vaccum treatment (4) or may b fed directly to the crystallization station (5) in which it is crystallized either in batches to from blocks in accordance with European 218,088 or continuously to form fils in accordance with German 3,419,137. If the process is to be carried out successfully, the temperature in the units (2) to (4) must be above 1420° C., the melting temperature of silicon.

In one particularly favorable embodiment of the process according to the invention, the silicon to be refined is first surface-oxidized. It can be of advantage to the purpose for which the silicon purified in accordance with the invention is to be subsequently used for the crystallization of the silicon to take place continuously to form granulate or films.

The following Example is intended to illustrate the process according to the invention without limiting it in any way.

EXAMPLE

A silicon granulate having an average particle size of approximatley 1 mm was obtained by continuous reduction of purified silicon tetrachloride with aluminium granulate in a rotating tube reactor. This starting material was found by analysis to contain the impurities shown in Table 1 which are largely attributable to the foreign atoms in the aluminium used.

10 kg of this silicon granulate were introduced continuously for 10 hours by a screw conveyor into a inclined graphite tube heated to the melting temperature of silicon and melted therein. An optimal product flow was obtained at an angle of inclination of the tube of 25°. Argon was used as inert gas. During the continuous melting process, the separation of slags and silicon melt was observed. The slag is separated during the melting process and collects in the form of a loose dust at the product input end of the melting tube. The slag was mechanically removed by a scraper during the test. 85% of the slag consisted of $Al_2O_3$ together with small quantities of SiC with adhering silicon residues. In all, 106 g slag were obtained over the 10 hour period. The silicon melt removed at the end of the tube was continuously fed to the next refining step in which is was introduced into a vertically arranged tube of $Al_2O_3$ ceramic filled with SiC fragments and heated to the melting temperature of silicon. Under the effect of the SiC fragments, the silicon was finely distributed in the form of a thin film of silicon melt. This melt film was treated in countercurrent with a reactive gas mixture consisting of 18 liters/hour trichlorosilane, 30 liters/hour silicon tetrachloride, 50 liters/hour hydrogen, 2 liters/hour steam and 10 liters/hour argon (the quantities are based on a temperature of 100° C.). The silicon melt issuing in droplet from at the lower end of the tube after passing through the gas treatment zone was crystallized by free fall while the gas treatment was continued and was collected in the form of pellets in a ceramic pan.

The analysis of the refined silicon is shown in Table 1.

TABLE 1

| | Impurities in the silicon (in ppm, unless other indicated) | | | | | | | | | |
|---|---|---|---|---|---|---|---|---|---|---|
| Al | B | Ba | Ca | Cr | Cu | Fe | Mg | Ti | C | O |
| Starting material | | | | | | | | | | |
| 1.1 [%] | 4 | 0.2 | 3 | 2 | 6 | 350 | 3 | 33 | 20 | 0.7 [%] |
| Pure silicon | | | | | | | | | | |
| 0.5 | 0.2 | 0.1 | 0.2 | 0.1 | 0.2 | 0.1 | 0.1 | 0.5 | 10 | 60 |

What is claimed is:

1. In a continuous process for purifying and refining silicon containing impurities,
   the improvement comprises continuosuly melting silicon to form a film of silicon melt, continuously treating the silicon melt film with reactive gas comprising steam, silicon tetrahalide, halogen silane, hydrogen chloride, mixtures thereof, or mixtures thereof with hydrogen, then continuously crystallizing the treated silicon melt.

2. A process as claimed in claim 1 wherein the silicon to be melted is in granulate form obtained continuously by reduction of silicon tetrachloride with aluminum granulate.

3. A process as claimed in claim 1 wherein that both the silicon melting step and the silicon melt treatment with reactive gases are carried out in contact with one or more inclined surfaces of a silicon-resistant material.

4. A process as claimed in claim 3 wherein the inclined surfaces are in the form of tubes or channels.

5. A process as claimed in claim 3 wherein the inclined silicon-resistant material comprises a plurality of surfaces formed by a pile or stack of silicon-resistant particles.

6. A process as claimed in claim 3 wherein the silicon-resistant material is a ceramic, mixed ceramics, high-density graphite, quartz glass, or combinations thereof.

7. A process as claimed in claim 6 wherein the silicon-resistant material is a ceramic or mixed ceramics containing SiC, $Si_3N_4$ or $Al_2O_3$.

8. A process as claimed in claim 1 wherein the reactive gas is mixed with an inert gas.

9. A process as claimed in claim 1 wherein the silicon to be refined is first surface-oxidized.

10. A process as claimed in claim 1 wherein the treated silicon melt is crystallized continuously to form granulate or solid films.

11. A process as claimed in claim 1 wherein prior to crystallization the treated silicon melt is degassed to remove gases dissolved therein.

* * * * *